United States Patent
Agnew et al.

(10) Patent No.: US 6,624,380 B2
(45) Date of Patent: Sep. 23, 2003

(54) DEVICE FOR RECOVERING SODIUM HYDRIDE

(75) Inventors: Stephen F. Agnew, San Diego, CA (US); Sergei Putvinski, La Jolla, CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 224 days.

(21) Appl. No.: 09/903,321

(22) Filed: Jul. 10, 2001

(65) Prior Publication Data

US 2003/0012717 A1 Jan. 16, 2003

(51) Int. Cl.[7] .............................................. B23K 10/00
(52) U.S. Cl. ........................... 219/121.37; 219/121.59; 219/121.43; 75/745
(58) Field of Search .................. 219/121.37, 121.59, 219/121.36, 121.43, 121.41, 121.4; 428/403, 407, 460–463; 75/745, 10.19

(56) References Cited

U.S. PATENT DOCUMENTS

| | | | |
|---|---|---|---|
| 3,998,941 A | * 12/1976 | Nelson | 423/646 |
| 4,003,824 A | * 1/1977 | Baird, Jr. et al. | 208/108 |
| 5,728,464 A | 3/1998 | Checketts | 428/403 |
| 5,817,157 A | 10/1998 | Checketts | 48/61 |
| 6,496,749 B1 | * 12/2002 | Yamaguchi et al. | 700/121 |

* cited by examiner

*Primary Examiner*—Mark Paschall
(74) *Attorney, Agent, or Firm*—Nydegger & Associates

(57) ABSTRACT

A device and method for producing sodium (Na) from a feed material such as a mixture of methane ($CH_4$) and sodium hydroxide (NaOH) includes a plasma torch configured to heat the feed material to a temperature sufficient to reduce and ionize sodium (Na). As such, a plasma jet is created by the plasma torch that contains ionized sodium (Na) and non-ionized neutrals such as hydrogen (H) and carbon monoxide (CO). From the plasma torch, the plasma jet is introduced into a chamber where a magnetic field has been established. Once inside the chamber the heated mixture of ions and neutrals interacts with the magnetic field in the chamber to cause the sodium ions to travel substantially along the magnetic field lines while the neutrals travel on paths that are essentially unaffected by the magnetic field. A collector is positioned to receive and accumulate sodium (Na).

21 Claims, 4 Drawing Sheets

DEVICE FOR RECOVERING SODIUM HYDRIDE

FIELD OF THE INVENTION

The present invention pertains generally to devices and methods for chemical separation. More particularly, the present invention pertains to devices and methods for the extraction of sodium from sodium compounds. The present invention is particularly, but not exclusively, useful for recovering sodium hydride from a mixture of methane and sodium hydroxide.

BACKGROUND OF THE INVENTION

Recently, there has been an abundant interest in the use of sodium hydride (NaH) as a portable energy source to produce hydrogen as a replacement for fossil fuels such as gasoline. For example, engines similar to the standard gasoline engines that are now used in automobiles can be manufactured that use hydrogen gas as a fuel. Unfortunately, the bulk amount of actual hydrogen gas that is needed for vehicle applications would require either an extremely large tank or a high-pressure vessel. Both of these requirements can be expensive and impractical for use on a vehicle. Thus, to avoid these requirements, devices have been proposed to produce hydrogen gas at relatively low pressures. Importantly, the gas can be produced as demanded by the hydrogen engine, by reacting sodium hydride with water according to the reaction:

$$NaH + H_2O \Rightarrow NaOH + H_2 \qquad \text{(Reaction 1)}$$

For example, U.S. Pat. No. 5,728,464 entitled "Hydrogen Generation Pelletized Fuel" which issued to Checketts on Mar. 17, 1998 discloses sodium hydride pellets for a hydrogen demand system. Specifically, Checketts discloses sodium hydride pellets that are coated with a water impervious barrier. The barrier can be removed either mechanically or electrically to expose the sodium hydride core for reaction with water to produce hydrogen.

As indicated by Reaction 1 above, a by-product of the reaction is sodium hydroxide (NaOH). It has been proposed elsewhere to recover sodium hydride (NaH) from the by-product sodium hydroxide (NaOH) by heating the sodium hydroxide (NaOH) in a methane ($CH_4$) atmosphere. Specifically, at a reaction temperature of approximately 900 C (1173 K), the reaction:

$$NaOH + CH_4 \Rightarrow CO + 2.5H_2 + Na(g) \qquad \text{(Reaction 2)}$$

can be used to produce sodium gas Na(g). Unfortunately, when the hot, reaction products of Reaction 2 are sent to a cold collector under modest pressures, sodium hydroxide (NaOH) rather than liquid sodium Na(l) condenses on the collector. Specifically, in accordance with the following analysis, pressures exceeding approximately 4200 atmospheres are required to condense liquid sodium Na(l) rather than sodium hydroxide (NaOH) on the cold collector.

Before concluding that impractical pressures are required to condense liquid sodium, attempts to shift the equilibrium by introducing other compounds into the mixture were considered. After consideration, this approach appears to be futile. Specifically, the following compounds (all in the gas phase) have been considered; H, Na, O, Na+, $H_2$, $O_2$, OH, NaH, CO, NaO, NaOH, $CO_2$, $H_2O$, $H_2CO$, $CH_4$. Carbon has very low vapor pressure and, therefore, carbon vapor has been excluded from the above list. FIG. 1 shows the concentrations of the different compounds as a function of temperature at a total pressure of 1 atm. FIG. 1 was obtained theoretically by minimizing free energy and using balance equations for the different elements. Compounds having a concentration less then $10^{-8}$ are not shown.

Referring to FIG. 1, it can be seen that at low temperatures, T<600 K, the major components are NaOH and $CH_4$. In the temperature range, 1000 K<T<2000 K, the major compounds are indeed CO, $H_2$, and Na vapor as predicted by Reaction 2. At T>3000 K, Na becomes ionized and $H_2$ molecules dissociate. The other compounds considered and listed above are not essential. Atomic and molecular oxygen is not present in the full temperature range. Therefore, at low temperatures, when Na is not ionized and hydrogen is in molecular form, a simple model based on Reaction 2 can be used. The partial pressures of methane, carbon monoxide and hydrogen can be expressed in terms of the partial pressures of NaOH and Na, using Reaction 2 as follows:

$$p_{CH4} = p_{NaOH}, \ p_{CO} = p_{Na}, \ p_{H2} = 2.5 p_{Na} \qquad \text{(eq. 1)}$$

As such, the total pressure will be:

$$p = p_{NaOH} + p_{CH4} + p_{Na} + p_{CO} + p_{H2} = 4.5 p_{Na} + 2 p_{NaOH} \qquad \text{(eq. 2)}$$

Thus, the equilibrium equation for Reaction 2 can be written as follows:

$$(p_{Na} p_{CO} p_{H2}^{2.5})/(p_{NaOH} p_{CH4}) = K(T)$$

or using equation (1):

$$2.5^{2.5} p_{Na}^{4.5} / p_{NaOH}^2 = K(T) \qquad \text{(eq. 3)}$$

Equations 2 and 3 allow the partial pressures of Na and NaOH to be evaluated as function of total pressure, p, and temperature, T. Thus, the full model revealed by FIG. 1 comports closely with the simple model (Reaction 2) at low temperatures, T<2000 K. Further, equations 2 and 3 show that at higher pressures, higher temperatures are required to reduce sodium.

Next, an analysis can be conducted to determine the temperature range in which the gaseous model is valid. Specifically, the gaseous model is valid when the partial pressures of Na or NaOH are less then the saturated pressures for these compounds. The other major compounds such as $H_2$, CO and $CH_4$ have very high vapor pressures, and accordingly, do not condense. FIG. 2 shows the saturated pressure to partial pressure ratios for the case presented in FIG. 1. It can be seen that at a total pressure of p=1 atm, the condensation point ($p_{sat}$=p) for NaOH occurs at a higher temperature than for Na. Thus, at this pressure, Na will be collected in the form of NaOH rather then metallic Na. An increase in the total pressure can shift the reaction and in principle can create a condition where Na has a condensation point at a higher temperature than NaOH. The total pressure necessary to condense Na rather than NaOH can be derived from equation 3 by replacing the partial pressures of each constituent by their corresponding saturated pressures:

$$2.5^{2.5} p_{s,Na}^{4.5} / p_{sNaOH}^2 < K(T)$$

The above condition is satisfied at T>3000 K and a total pressure of approximately:

$$p > 4.5 p_{s,Na} + 2 p_{s,NaOH} = 4200 atm$$

which is simply not practical. Thus, the above analysis indicates that at moderate pressures, the equilibrium condensation of Na does not take place.

The present invention contemplates separation of Na from the other gases by ionization. For example, consider a mixture of NaOH and $CH_4$ heated to a temperature of 3000–4000 K rather than to 1000 K. This heating can be accomplished using a plasma torch. At these higher temperatures, Na atoms will be fully ionized. The present invention further contemplates separating the ionized Na component from the non-ionized neutrals (i.e. CO and $H_2$) by introducing the mixture in the form of a plasma jet into a strong magnetic field. In the magnetic field that is directed along the jet, sodium ions will move predominantly along the magnetic field lines and neutrals will diffuse from the plasma jet radially, where the neutrals can be pumped from the device. As such, an increase of sodium concentration along the plasma jet can be expected. Specifically, the following analysis estimates the increase in sodium concentration along the plasma jet.

First, consider a comparison between the magnetic pressure and the gas pressure. Magnetic pressure, $p_m$, can be found using the equation:

$$p_m = B^2/8\pi,$$

or in practical units $$p_m[Pa] = B_G^2/80\pi.$$

For example, for B=3 kG, $p_m$=3.6 $10^4$ Pa=270 Torr which is larger then the expected gas pressure in the plasma jet, p=1–5 kPa. To derive the radial velocities of the neutrals, ions, and electrons, momentum balance equations for these particles with friction forces acting between different components can be considered. Assuming a cylindrical plasma jet in a uniform axial magnetic field, the result is:

$$V_{ri} = V_{re} = -(c/eB)^2 (dp_\Sigma/dr)(\mu_{i0}\mu_{e0}K_{i0}K_{e0}n_0/n_i/(\mu_{i0}K_{i0}+\mu_{e0}K_{e0}) + \mu_{ei}K_{ei}) \quad \text{(eq. 4)}$$

and $$V_{r0} = V_{ri} - (dp_0/dr)/(\mu_{i0}K_{i0}+\mu_{e0}K_{e0})/n_i/n_0 \quad \text{(eq. 5)}$$

where $p_\Sigma$ is total pressure of all components, $\mu_{ij}=M_iM_j/(M_i+M_j)$ and the K's are collision rates. In equation 5, $\mu_{e0}K_{e0} << \mu_{i0}K_{i0}$ and can be neglected. It can be seen that the plasma radial velocity can be made small by increasing the magnetic field. As one can expect, the separation of neutrals is driven by neutral pressure. Equation 5 is valid when the plasma density is high and the neutral's mean free path before collision with ions is smaller than the jet radius. In terms of plasma density, this condition is fulfilled for a jet with radius, a=cm, when $n_i \geq 10^{20}$ $m^{-3}$, or $p \geq 3$ Pa, both of which are valid for the plasma jets of interest considered below.

Plasma diffusion across a magnetic field is generally anomalous, and accordingly, instead of using equation 4, the radial plasma velocity can be used as a parameter. As such, the radial expansion of the plasma jet can be described by the following:

$$a(x) = a_0 + (V_r/V_x)x.$$

Here, x is the coordinate along the jet and $a_o$ is the initial radius of the jet. It is also assumed that the axial velocity of the jet is independent of x. In this approximation, plasma density can be described by the following equation:

$$dG_i/dx = -\pi a^2 K_r(T) n_i^3 \quad \text{(eq. 6)}$$

Here, $G_i = \pi a^2 V_x n_i$ and $K_r$ is a three-body recombination coefficient. Further, the dependence of $K_r$ on T can be derived from Voronov's ionization rate (see for example, G. S. Voronov, Atomic Data and Nuclear Data Tables, Vol. 65, No. 1, January, 1997) and the Saha equilibrium for sodium ions. Temperature scaling for $K_r$ is:

$$K_r = 6.5 \ 10^{-41}(5800/T_K)^{1.15}.$$

It is assumed that sodium neutrals escape from the plasma jet and, therefore, equation 6 describes the decrease of sodium flux along the plasma jet.

Using equation 5, one can derive an equation for the neutral flux in the jet:

$$dG_0/dx = -2G_0T_0/(\mu_{i0}K_{i0}n_iV_xa^2) \quad \text{(eq. 7)}$$

where $G_0 = \pi a^2 V_x n_0$. Equation (7) allows estimation of the required length of the jet:

$$L = \mu_{i0}K_{i0}G_i/2\pi T_0.$$

It can be seen that the separation length does not depend on the jet radius or jet density but only on the ion throughput and the gas temperature. For example, for a Hydrogen and CO mixture, with $T_0$=2000:

$$L(m) > 30 G_i (mol/s)$$

In a device with an axial length, L~1 m, the throughput should not exceed $10^{-2}$ mol/s for a good separation. Separation can be affected by recombination of the Sodium ions. Recombination length can be estimated from equation 6:

$$L = V_x/K_r n_i^2.$$

For example, at L~1 m and T=2000 K, recombination is small when $n_i < 2 \ 10^{21}$ $m^{-3}$ (i.e. total density $n < 9 \ 10^{21}$ $m^{-3}$) or when plasma pressure in the jet is less then approximately 250 Pa. At a higher pressure, recombination can significantly reduce the separation of sodium.

To better estimate this effect, equations 6 and 7 can be solved together with power balance equations for ions and neutrals:

$$3n_i^{5/3}V_x dS_i/dx = (2T_i + E_{iz})K_r n_i^3 - P_{rad} - K_{i0}n_i n_0 (T_i - T_0)$$

$$1.5 n_0^{5/3} V_x dS_0/dx = K_{i0} n_i n_0 (T_i - T_0) - k(T_0 - T_{out}) a^2$$

where $S = T/n^{2/3}$. The radiation power has been estimated for a single sodium line. FIG. 3 shows the plasma and gas pressures, and FIG. 4 shows the temperatures as a function of distance from the nozzle. It can be seen that $T_i$ is very close to $T_0$ inside the plasma jet. Gas temperature outside the plasma jet, $T_{out}$, decreases much faster due to adiabatic expansion of the gas. It was assumed that neutral gas can freely expand outside the jet. In this case the gas pressure in the jet is also much higher then the ambient pressure. FIG. 5 shows the throughput of sodium ions (GNa) and CO neutrals (GNaOH). Presence of CO will cause condensation of NaOH during thermal quench on a cold collector and should be minimized. It can be seen that at L=0.5 m, sodium throughput is about 3 times larger then CO throughput and, therefore NaOH impurity will be about 30% in this particular case. However, this fraction is sensitive to the divergence of the jet. For example, fraction of NaOH decreases to only 1% at zero divergence of the jet, $V_r$=0. If initial pressure is small (i.e. p<2000) then the recombination effect is not very important. At higher pressures, the recombination effect can be significant.

Faster cooling of the jet also reduces separation because lower temperatures increase the recombination of sodium ions and reduce the radial diffusion of neutrals from the jet. An example of fast jet cooling (black body radiation) is shown in FIGS. 7 and 8.

The negative effects of jet divergence, ion recombination, and cooling of the jet on the ion separation can be reduced if a radial electric field is applied to the plasma jet. The electric field can be applied, for example, by installing ring electrodes in the separation chamber and biasing these electrodes in such a manner that an electric field with a desirable radial profile will be set up. Due to the large electrical conductance of the plasma along the magnetic field lines, the radial electric field will exist in the full volume of the chamber. By directing the electric field inwardly, the ions will be restrained from radial expansion.

The crossed radial electric and magnetic fields will cause ion and electron rotation with azimuthal velocity $V_E=E/B$. The azimuthal friction force between rotating ions and slower rotating neutrals will result in an inward ion drift. As a result, the jet diffusive expansion will be suppressed. Because electrons cannot move in the radial direction, radial current will flow in the plasma. This current is supplied by the ring electrodes. Obviously, the electric field will only propagate from the electrodes to the plasma volume if the electrical conductivity along the magnetic field lines is larger than the electrical conductivity across the magnetic field in the radial direction. Stated another way, the voltage drop along the field lines has to be much smaller than the voltage drop across the field lines, $$U_\parallel/U_r = 2(L/a)^2(\sigma_r/\sigma_\parallel) \ll 1. \qquad \text{(eq. 8)}$$

Radial electrical conductivity, $\sigma_r$, can be estimated with the help of an azimuthal momentum balance of ions and neutrals, $$0 = \mu_{io}K_{io}n_0n_i(V_{\theta 0}-V_{\theta i}) + \nu_0 d^2V_{\theta 0}/dr^2 \qquad \text{(eq. 9)}$$

$$0 = en_iV_{ri}B/c + \mu_{io}K_{io}n_0n_i(V_{\theta 0}-V_{\theta i}). \qquad \text{(eq. 10)}$$

The viscous force can be estimated by replacing $d^2V_{\theta 0}/dr^2$ with $2V_{\theta 0}/a^2$, and representing neutral viscosity as $\nu_0 = n_0 m_0 V_{th0}/3a(a/\lambda_0+1)$. The viscosity has been corrected to extend momentum loss on low density $\lambda_0/a>1$. Radial electrical conductance can be derived from the above equations:

$$\sigma_r = j_r/E_r = (2e^2n_i/m_c\omega_e)(m_0/m_i)(n_0/n_i)(V_{th0}/3\omega_ia)/(1+a/\lambda_0+2m_0V_{th0}/3a\mu_{io}K_{io}n_i) \qquad \text{(eq. 11)}$$

where $\omega_e = eB/m_ec$, and $\lambda_0$ is the neutral atom mean free path. Parallel electrical conductivity can be described by the well known classical approximation, $$\sigma_\parallel = 2n_i e^2 \tau_e/m_e. \qquad \text{(eq. 12)}$$

Equation 8 can be combined with equations 11 and 12 to yield:

$$\omega_e\tau_e \gg (\tfrac{2}{3})(L/a)^2(m_0/m_i)(n_0/n_i)(V_{th0}/\omega_ia)/(1+a/\lambda_0+2m_0V_{th0}/3a\mu_{io}K_{io}n_i). \qquad \text{(eq. 13)}$$

Because $\omega_{e,i} \sim B$ and $\tau_e \sim 1/n_i$, the last equation allows estimation of the minimum magnetic field for a given plasma density that is needed for propagation of electric field from the electrodes to the plasma. It is well known that the radial field cannot only compress the plasma jet but can also heat the ion component to a temperature, $T_i$, $$T_i = m_iV_E^2/3 \qquad \text{(eq. 14)}$$

The ions, in turn, will heat the neutral components and electrons, speeding up the diffusion of neutrals from the plasma jet. Higher temperatures will reduce the recombination of the Na ions. For example, at a magnetic field B=3 kG and jet radius of a=5 cm, the ion density can be as high as $n_i = 10^{21} m^{-3}$ ($U_\parallel/U_r \sim 0.1$) The required voltage is about 100V. At this voltage the ion temperature in the jet will be about 2–3 eV, and radial contraction of the jet due to the radial electric field is $V_r/V_\parallel \sim 0.05$. The ion Larmor radius is about 4 mm and, hence, ten ring electrodes are sufficient to control the radial profile of electric field. A jet length of L=1 m is sufficient to remove most of the neutrals by differential pumping. Ion throughput is about G=0.07 mol/s.

Thus in accordance with the analysis set forth above, a separation device with axial length of about 1 m can produce about 0.1–0.2 g of sodium per second. Excessive recombination in the plasma jet and plasma cooling can be avoided by applying an inwardly radial electric field, V~100V. Although the separation of Na from NaOH is not perfect, an NaOH impurity of only about 5%-10% can be expected on the collector.

In light of the above, it is an object of the present invention to provide devices and methods suitable for the purposes of extracting liquid sodium (Na) from a material containing sodium compounds such as sodium hydroxide (NaOH). It is another object of the present invention to provide devices and methods for producing sodium hydride from a mixture of sodium hydroxide (NaOH) and methane ($CH_4$). Yet another object of the present invention is to provide devices and methods for producing sodium hydride which are easy to use, relatively simple to implement, and comparatively cost effective.

SUMMARY OF THE PREFERRED EMBODIMENTS

The present invention is directed to a device and method for producing sodium from a feed material that contains sodium compounds. For example, a mixture of methane ($CH_4$) and sodium hydroxide (NaOH) is suitable for use as a feed material in the device and methods of the present invention to produce sodium. Once the sodium is extracted from the feed material in accordance with the present invention, it can be mixed with hydrogen gas to form sodium hydride (NaH). As described above, sodium hydride (NaH) is useful as an alternative energy source, because hydrogen gas is generated when sodium hydride (NaH) is mixed with water.

For the present invention, a plasma torch is configured to heat the feed material to a temperature sufficient to reduce and ionize sodium (Na). As such, the plasma torch creates a plasma jet containing ionized sodium (Na). For a feed material such as the methane ($CH_4$) and sodium hydroxide (NaOH) combination described above, a temperature above 2000 degrees C. is sufficient to reduce and ionize sodium. At this temperature, other molecules created in the plasma jet, such as hydrogen (H) and carbon monoxide (CO), will remain as non-ionized neutrals.

From the plasma torch, the plasma jet is introduced into a chamber where a magnetic field has been established. Preferably, the chamber is surrounded by a wall shaped as an elongated cylinder. The wall defines a longitudinal axis and is formed with a first end and a second end. The cylindrical wall is preferably open at both ends, allowing particles to enter the chamber at the first end and exit the chamber at the second end. To establish the magnetic field inside the chamber, standard coils can be mounted on the outside of the wall, and an electrical current can be selectively passed through the coils. Preferably, the magnetic field established inside the chamber is oriented substantially parallel to the longitudinal axis. Further, the magnetic field is preferably established having a substantially uniform field strength along the longitudinal axis. In accordance with the present invention, an optional ring electrode can be positioned in the chamber near the second end to establish an inwardly directed electric field in the chamber. As explained above, the inwardly directed electric field can reduce the negative effects of jet divergence, ion recombination and cooling of the jet.

For the present invention, the first end of the cylindrical wall is positioned adjacent the plasma torch to allow the plasma jet that is created by the plasma torch to be directed into the chamber. Once inside the chamber, the heated mixture of ions and neutrals interacts with the magnetic field in the chamber to cause the sodium ions to travel along the magnetic field lines. Thus, the sodium ions enter the chamber at the first end, travel on paths substantially parallel to the longitudinal axis and exit the chamber at the second end. On the other hand, the neutrals are essentially unaffected by the magnetic field. As such, the neutrals are able to travel in directions that extend away from the longitudinal axis.

A collector plate is positioned near the second end of the cylindrical wall to receive and accumulate sodium (Na). The cylindrical wall is further formed with an outlet near its first end to pass neutrals from the chamber to a secondary processing tank. Conventional techniques can be used at the secondary processing tank to separate hydrogen gas from any other gasses present. If desired, the accumulated sodium from the collector plate can be combined with the gaseous hydrogen from the secondary processing tank to form sodium hydride (NaH).

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
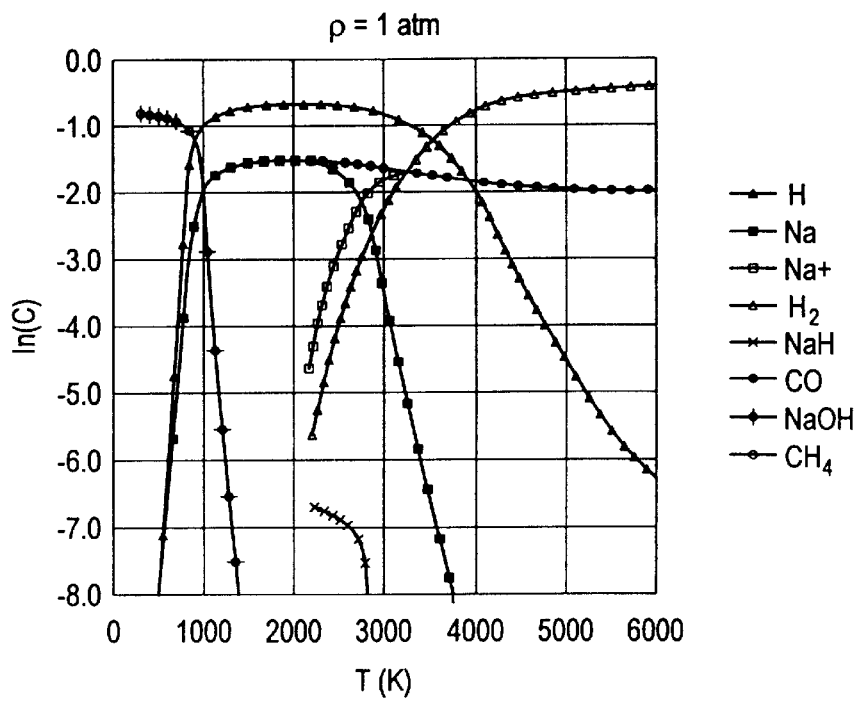
FIG. 1 is a graph showing the concentrations of compounds as a function of temperature at a pressure of 1 atm. after heating an initial mixture of sodium hydroxide (NaOH) and methane ($CH_4$)
Figure 2:
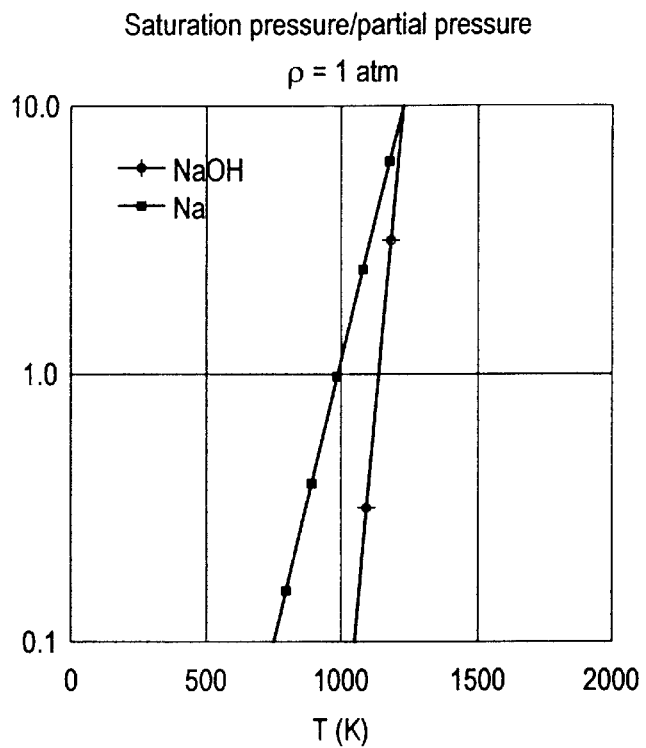
FIG. 2 is a graph showing the saturated pressure to partial pressure ratios for sodium (Na) and sodium hydroxide (NaOH) as a function of temperature.
Figure 3:
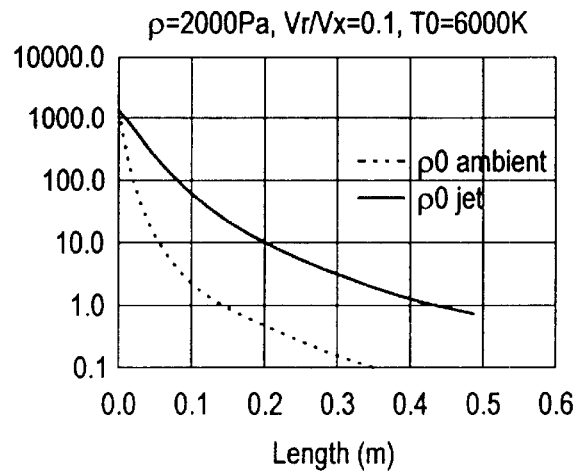
FIG. 3 is a graph showing the pressure of neutrals along the jet for an initial jet radius a=1 cm.
Figure 4:
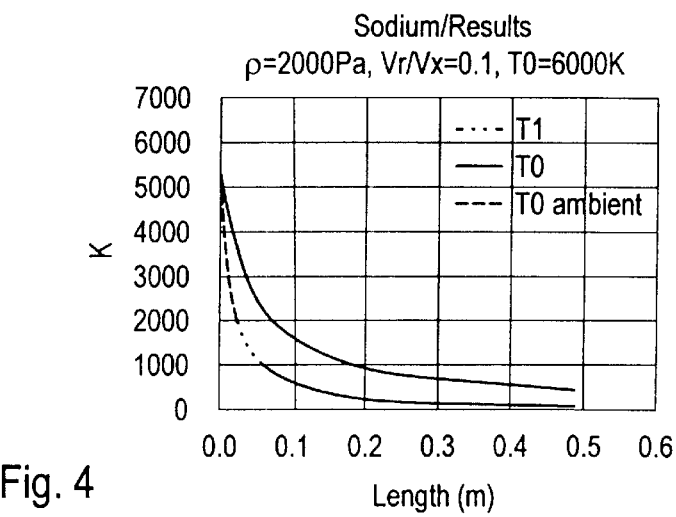
FIG. 4 is a graph showing the ion and neutral temperature along the jet.
Figure 5:
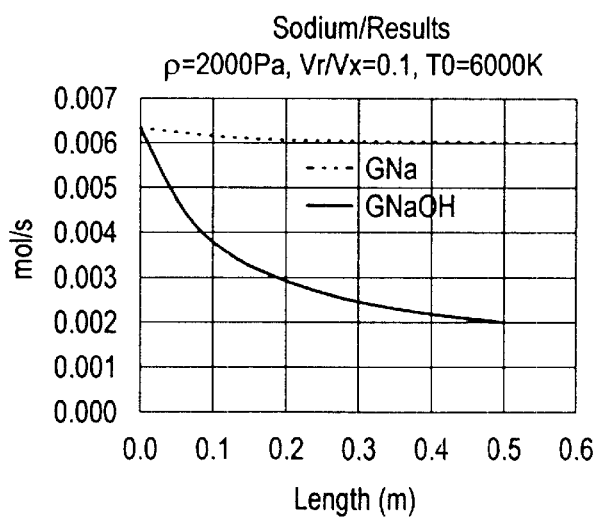
FIG. 5 is a graph showing the throughput of sodium ions (GNa) and oxygen atoms (GnaOH, in the form of CO), along the jet.
Figure 6:
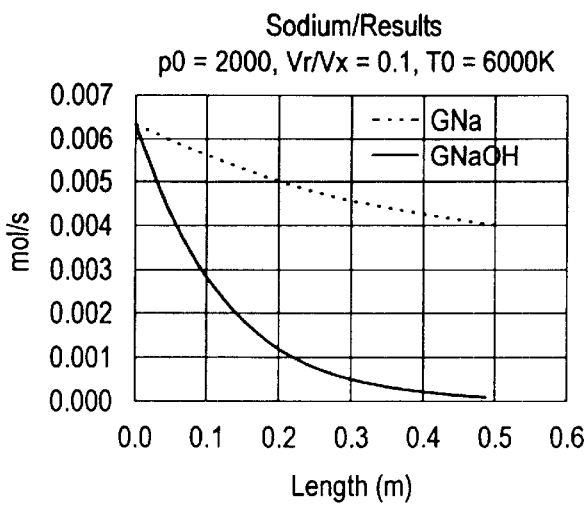
FIG. 6 is a graph showing the throughput of sodium ions (GNa) and oxygen atoms (GnaOH, in the form of CO), along the jet for a jet without divergence, $V_r=0$.
Figure 7:
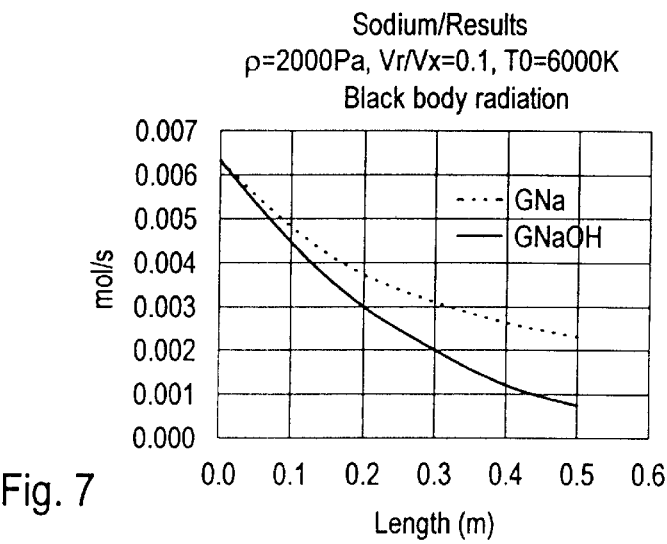
FIG. 7 is a graph showing the throughput of sodium ions (GNa) and oxygen atoms (GnaOH, in the form of CO), along the jet with the addition of black body radiation in the jet cooling.
Figure 8:
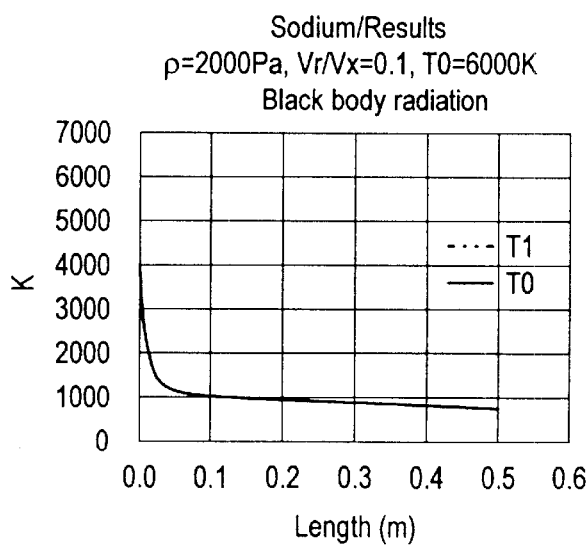
FIG. 8 is a graph showing the temperature along the jet if the plasma radiated as a black body.
Figure 9:
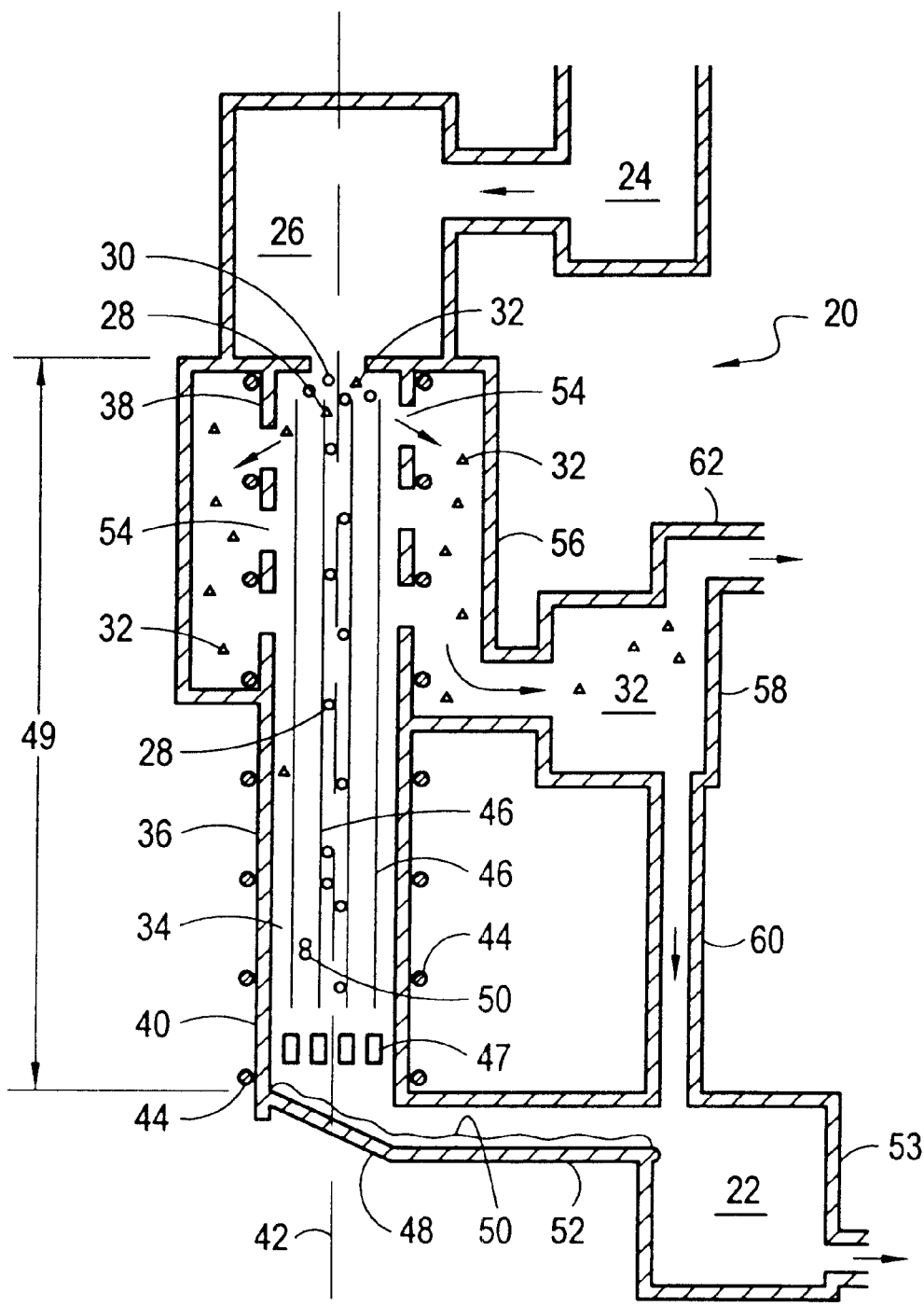
FIG. 9 is a schematic diagram of a system in accordance with the present invention with portions of the system shown in cross section and portions of the system shown as functional blocks for clarity.

Referring to FIG. 9, a system in accordance with the present invention is shown and generally designated 20. As best appreciated with reference to FIG. 9, the purpose of the system 20 is to produce sodium hydride 22 from a feed material 24 that contains sodium compounds. An exemplary feed material 24 suitable for use in the system 20 includes a mixture having methane ($CH_4$) and sodium hydroxide (NaOH) as major constituents.

As shown in FIG. 9, the system 20 includes a plasma torch 26. In accordance with the present invention, the plasma torch 26 is configured to heat the feed material 24 to a temperature sufficient to reduce and ionize sodium (Na). Although only one feed line is shown for introducing the feed material 24 into the plasma torch 26, it is to be appreciated that the components (i.e. NaOH and $CH_4$) can be introduced into the plasma torch 26 in separate or multiple feed lines.

Once the feed material 24 is introduced into the plasma torch 26, the plasma torch 26 heats the feed material 24 to a temperature above 2000 degrees K and creates a plasma jet 28. Specifically, the torch 26 heats the feed material 24 at or above a temperature sufficient to reduce and ionize sodium (Na). It is contemplated that the plasma torch 26 may heat the feed material 24 to temperatures as high as 6000 degrees K or higher in accordance with the present invention. Importantly, the plasma torch 26 heats the feed material 24 to a temperature wherein at least a portion of the other molecules created in the plasma jet 28 such as hydrogen (H) and carbon monoxide (CO) will remain as non-ionized neutrals (note: these molecules will be present when a methane ($CH_4$) and sodium hydroxide (NaOH) combination is used as a feed material 24). Thus, as shown, the plasma jet 28 contains sodium ions 30 and neutrals 32.

Referring still to FIG. 9, it is to be appreciated that from the plasma torch 26, the plasma jet 28 is introduced into a chamber 34. In accordance with the present invention, the initial pressure at which the plasma jet 28 is introduced into the chamber 34 is preferably maintained at approximately 2000 Pa. As shown, the chamber 34 is surrounded by a wall 36 (shown in cross-section) which is preferably shaped as an elongated cylinder. The wall 36 is formed with a first end 38, a second end 40 and is preferably substantially centered on a longitudinal axis 42. As shown, the cylindrical wall 36 is preferably open at both ends 38, 40, allowing the plasma jet 28 to enter the chamber 34 at the first end 38 of the cylindrical wall 36, and to allow sodium ions 30 to exit the chamber 34 at the second end 40 of the cylindrical wall 36.

In the preferred embodiment of the present invention, a plurality of coils 44 is provided to establish a magnetic field in the chamber 34. As shown, coils 44 can be mounted on the outside of the wall 36 and a power source (not shown) used to selectively pass an electrical current through the coils 44 to generate a magnetic field in the chamber 34. Preferably, as shown by the magnetic field lines 46, the magnetic field established in the chamber 34 is oriented substantially parallel to the longitudinal axis 42. Further, the magnetic field is preferably established having a substantially uniform field strength along the longitudinal axis 42. Although a plurality of coils 44 is shown to generate the magnetic field in the chamber 34, it is to be appreciated that other methods known in the pertinent art can be used to create the magnetic field in the chamber 34 for the present invention.

Referring still to FIG. 9, an optional set of ring electrodes 47 can be positioned in the chamber 34 near the second end 40 of the wall 36. A voltage source (not shown) can be used to selectively bias the electrodes 47 to establish an electric field in the chamber 34 that is directed radially inward from the wall 36 to the longitudinal axis 42. As explained above, the electric field can reduce the negative effects of jet divergence, ion recombination and cooling of the plasma jet 28.

Also shown in FIG. 9, the first end 38 of the cylindrical wall 36 is positioned adjacent to the plasma torch 26 to allow the plasma jet 28 created by the plasma torch 26 to be directed into the chamber 34. Once inside the chamber 34, the heated mixture of sodium ions 30 and neutrals 32 interacts with the magnetic field in the chamber 34 to cause the sodium ions 30 to travel along the magnetic field lines 46. Consequently, as shown, the sodium ions 30 enter the chamber 34 at the first end 38 of the cylindrical wall 36, travel on paths substantially parallel to the longitudinal axis 42 and exit the chamber 34 at the second end 40 of the cylindrical wall 36. A collector plate 48 is positioned near the second end 40 of the cylindrical wall 36 to receive and accumulate neutral sodium atoms 50. In accordance with the mathematics presented above, the collector plate 48 is preferably positioned at a distance 49 that is approximately one meter from the plasma torch 26. As shown, some of the sodium ions 30 may recombine to form neutral sodium atoms 50 near the second end 40 of the cylindrical wall 36 before reaching the collector plate 48. In any case, both the neutral sodium atoms 50 and the sodium ions 30 will reach the collector plate 48, which may be temperature controlled to allow the sodium 30, 50 to accumulate in the liquid state. As shown, a pipe 52 can be provided to route the liquid sodium 50 into the reaction tank 53 for combination with hydrogen to form sodium hydride 22.

Unlike the sodium ions 30, the neutrals 32 travel on paths that are essentially unaffected by the magnetic field. As shown, the neutrals 32 are able to travel in directions that cross the magnetic field lines 46 and extend away from the longitudinal axis 42. In accordance with the present invention, one or more outlets 54 is provided in the wall 36 to allow the neutrals 32 to exit the chamber 34. As shown, a housing 56 can be provided to direct the neutrals 32 that exit the chamber 34 from the outlets 54 to a secondary processing tank 58. Conventional processing techniques can be used at the secondary processing tank 58 to separate hydrogen gas from any other gasses present. If desired, pipe 60 can be used to route the gaseous hydrogen extracted at the secondary processing tank 58 to the reaction tank 53 for combination with the accumulated liquid sodium 50 from the collector plate 48 to form sodium hydride 22 (NaH). Also shown, pipe 62 can be provided to extract CO from secondary processing tank 58.

While the particular devices and methods for recovering sodium hydride as herein shown and disclosed in detail are fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for producing sodium hydride (NaH) from a mixture of methane ($CH_4$) and sodium hydroxide (NaOH), said device comprising:

a means for establishing a magnetic field in a volume, said magnetic field being oriented in a direction substantially parallel to an axis passing through said volume;

a means for heating said mixture to a temperature sufficient to reduce and ionize sodium (Na), while at least one other molecule in said heated mixture remains as a non-ionized neutral;

a means for introducing said heated mixture into said volume for interaction with said magnetic field to cause said sodium ions to travel along said magnetic field lines in the direction of said axis while at least a portion of said neutrals travel in directions that extend substantially away from said axis; and a means for collecting said sodium ions after travel along said magnetic field lines.

2. A device as recited in claim 1 further comprising a means for combining said collected sodium ions with hydrogen gas to form sodium hydride.

3. A device as recited in claim 1 wherein said means for heating said mixture and said means for introducing said heated mixture into said volume comprise a plasma torch.

4. A device as recited in claim 3 wherein the pressure in said plasma torch does not exceed approximately 2000 Pa.

5. A device as recited in claim 1 further comprising a means for establishing an electric field in said volume, said electric field being directed radially inward toward said axis to restrain said sodium ions from radial expansion.

6. A device for producing sodium (Na) from a material containing sodium compounds, said device comprising:

a wall surrounding a chamber, said wall formed with a first end and a second end and defining an axis extending from said first end to said second end, said first end being formed as an opening to said chamber;

a means for generating a magnetic field in said chamber; and a means for heating said material to a temperature sufficient to reduce and ionize at least a portion of the sodium atoms in said material, and for subsequently introducing said material into said chamber through said first end of said wall for interaction with said magnetic field to cause at least a portion of said sodium ions to travel substantially in the direction of said axis.

7. A device as recited in claim 6 wherein said wall is substantially shaped as an elongated cylinder between said first end and said second end and said wall is substantially centered on said axis.

8. A device as recited in claim 7 wherein said means for establishing a magnetic field in said chamber establishes a magnetic field that is aligned substantially parallel to said axis.

9. A device as recited in claim 6 further comprising a collector plate positioned near said second end of said wall to collect said sodium ions after travel through said chamber.

10. A device as recited in claim 6 wherein said wall is approximately one meter in length between said first end and said second end.

11. A device as recited in claim 6 wherein said means for heating said material to a temperature sufficient to reduce and ionize at least a portion of the sodium atoms in said material, and for subsequently introducing said material into said chamber through said first end of said wall comprises a plasma torch mounted on said wall.

12. A device as recited in claim 11 wherein said plasma torch is configured to maintain the material in said chamber near said first end at a pressure of less than approximately 2000 Pa.

13. A device as recited in claim 11 wherein said plasma torch is configured to heat said material to a temperature wherein at least one other molecule in said heated mixture remains as a non-ionized neutral.

14. A device as recited in claim 13 wherein said wall is formed with at least one outlet near said first end to allow said neutrals to exit said chamber.

15. A method for producing sodium comprising the steps of:
- heating a material containing sodium compounds to a temperature sufficient to reduce and ionize sodium (Na), while at least one other molecule in said material remains as a non-ionized neutral;
- establishing a magnetic field in a volume;
- introducing said heated mixture into said volume for interaction with said magnetic field to cause at least a portion of said sodium ions to travel in a direction substantially along the magnetic field lines of said magnetic field while at least a portion of said neutrals travel in directions substantially across said magnetic field lines of said magnetic field; and
- collecting at least a portion of said sodium ions after travel along said magnetic field lines.

16. A method as recited in claim 15 wherein an axis extends through said volume and wherein said magnetic field established in said volume is oriented in a direction substantially parallel to said axis.

17. A method as recited in claim 16 wherein said magnetic field established in said volume is substantially uniform in magnitude along said axis.

18. A method as recited in claim 15 wherein said material containing sodium compounds comprises a mixture of methane ($CH_4$) and sodium hydroxide (NaOH).

19. A method as recited in claim 15 further comprising the step of combining said collected sodium ions with hydrogen gas to form sodium hydride (NaH).

20. A method as recited in claim 19 wherein at least a portion of said hydrogen gas used to form sodium hydride (NaH) is obtained from said volume.

21. A method as recited in claim 15 wherein said step of heating a material containing sodium compounds to a temperature sufficient to reduce and ionize sodium (Na) heats the material to a temperature exceeding 2000 degrees K.

* * * * *

UNITED STATES PATENT AND TRADEMARK OFFICE
CERTIFICATE OF CORRECTION

PATENT NO. : 6,624,380 B2
DATED : September 23, 2003
INVENTOR(S) : Stephen F. Agnew and Sergei Putvinski It is certified that error appears in the above-identified patent and that said Letters Patent is hereby corrected as shown below:

<u>Column 5</u>,
Line 30, delete "$U_{\|}/U_r=2(L/a)^2(\sigma_r/\sigma)\ll 1.$" insert -- $U_{\|}/U_r =2(L/a)^2(\sigma_r/\sigma_{\|})\ll 1.$ --

<u>Column 6</u>,
Line 7, delete "$V_r/V_{\|}\sim 0.05$" insert -- $V_r/V_{\|}\sim -0.05$ --

Signed and Sealed this

Sixteenth Day of December, 2003

JAMES E. ROGAN
*Director of the United States Patent and Trademark Office*